Sept. 24, 1929.  W. J. CROWELL, JR  1,728,927
APPARATUS FOR MAKING REENFORCED SHEATHING
Filed Feb. 1, 1927   5 Sheets-Sheet 1

Inventor
William J. Crowell Jr.

Sept. 24, 1929.   W. J. CROWELL, JR   1,728,927
APPARATUS FOR MAKING REENFORCED SHEATHING
Filed Feb. 1, 1927   5 Sheets-Sheet 3

Inventor
William J. Crowell Jr.

Patented Sept. 24, 1929

1,728,927

UNITED STATES PATENT OFFICE

WILLIAM J. CROWELL, JR., OF WYNCOTE, PENNSYLVANIA, ASSIGNOR TO BENJAMIN E. CROWELL, OF MEDIA, PENNSYLVANIA

APPARATUS FOR MAKING REENFORCED SHEATHING

Application filed February 1, 1927. Serial No. 165,107.

My invention relates to the manufacture of reenforced sheathing for making partition walls and the like, and is intended to be a development of the subject matter of an application of Benjamin E. Crowell entitled Method and apparatus for manufacturing reenforced sheathing, Serial No. 165,113, which is intended to be copending herewith.

This sheathing is normally made of plaster and burlap, reenforced along the sides with perforated angle irons and reenforced at the ends and one or more intermediate points with angle irons or channels, that may also be perforated.

The sheathing is usually formed in moulds about two feet wide and of indefinite length.

The bottom of a mould is covered with perhaps one-half inch of liquid or "gaged" plaster and the fabric reenforcing, usually burlap, is pushed into the wet plaster over the width and length of the mould.

The opposing side angles are then pushed to place, with their flats horizontal and vertical, the horizontal flat of each angle being pressed down into the plaster and the vertical flat lying out along the side of the mould. The submerged horizontal flat portions are then tied to place by full-length overlapping narrow strips of burlap and additional plaster.

Light perforated channel irons or other suitable reenforcing members, are then placed across the ends of each sheet and usually at one or more intermediate points, being tied to place by plaster and sisal or jute fibre, or less usually by plaster and burlap.

The sheathing is made in definite lengths, as 8 feet and 10 feet, acording to requirements of the building trade. The angle irons along the sides are cut to the length of the sheathing and evenly placed in opposing pairs so that each long moulding comprises a number of sheets that are readily cut apart between the successive pairs of side angles. The transverse reenforcing is usually at each end and at the middle of each sheet.

The main object of my invention is to provide a method and apparatus for inexpensive and rapid manufacture of sheathings of this general character, whether made of plaster, burlap and angle iron reenforcing or made of other suitable plastic material adapted to mould and harden with the same or other suitable reenforcing materials.

Throughout this specification and the appended claims the word burlap is intended to include in its broader application commercial burlap and any suitable reenforcing material adapted to delivery from a roll and to be pressed into the soft plastic material, and likewise the word plaster is intended to include in its broader application the plaster of commerce and any suitable plastic material adapted to mould and harden. Burlap may thus include the burlap of commerce, wire mesh, many suitable fabrics, etc. and plaster may include the plaster of commerce and many different cements. However in the preferred application of my invention I use the burlap of commerce and the plaster of commerce respectively.

A further purpose is to provide the sides of mould supporting benches with longitudinal and transverse recesses for storing raw materials.

A further purpose is to wash out and recharge a moulding machine at the successive benches at which it operates, moving an overhead charging machine to charging positions at the successive benches, preferably having one charging machine at each side of a row of benches for use successively at the ends of alternate benches.

A further purpose is to use the same washwater over and over upon the same machines, optionally using successive portions of the wash-water for charging successive mixes of plaster in order to take advantage of any retarding influence of the oil usually present in wash-water, upon the setting of the plaster.

A further purpose is to store finished sheets of sheathing on end upon spaced rails preferably in front of the ends of the benches a sufficient distance to be out of the way of a turn-table for transferring the moulding machines from bench to bench.

A further purpose is to fasten finished sheets of sheathing together into bales by means of heavy wires hooking into perforations of the side reinforcement members of adjacent sheets, tightening the wires after the hooks have been inserted, by crimping the wires.

A further purpose is to optionally place burlap and plaster over one or both ends of a bale of sheathing to strengthen the tie between the sheets of the bale and to protect the ends of the sheet from possible injury during storage and shipment.

A further purpose is to operate a moulding machine that is adapted to lay a bed of gaged plaster and burlap along a long mould, in a cycle which includes charging the machine with gaged plaster at one end of the mould, rolling the machine along the length of the mould to operate upon the mould, rolling it from the mould on to a turn-table carriage, turning the turn-table through 90 degrees, pushing it to the next mould, turning it through a further 90 degrees and completing the cycle by washing it out at the end of the next mould, beginning the next cycle by recharging the machine with plaster.

A further purpose is to place a roll having multiple discs for pressing burlap into a bed of gaged plaster, so that it surrounds the axis of the rear wheels of a moulding machine carrying the roll.

A further purpose is to continuously eliminate gaged plaster from between the multiple discs of a roll pressing burlap into a bed of gaged plaster by means of stationary metal ribbons fitting between adjacent discs.

A further purpose is to use the movement of a moulding machine to gradually increase the opening of a valve from a supply tank of gaged plaster in order to maintain a uniform delivery of gaged plaster into the mold.

A further purpose is to operate upon an external gate valve of a supply tank of gaged plaster independently by the movement of the machine along its mould and by hand adjustment.

A further purpose is to deliver gaged plaster into a mould through a port having substantially the width of the mould and preferably directed rearwardly.

A further purpose is to hold a gate valve controlling the delivery of gaged plaster from a delivery port, to its duty against its seat by means of a lateral spring at each end of the port.

A further purpose is to place the delivery port of a horizontally pivoted cylindrical machine for mixing and delivering gaged plaster in the circumferential wall of the cylinder at one end of the bottom thereof, and to mount a gate valve and spout member at the port, holding it to place by springs and operating the member by longitudinal movement.

A further purpose is to handle sheets of sheathing by means of a two-wheeled handtruck, having an angularly inclined seat for receiving the sheets and adapted to carry the sheets on edge and end, inclined sufficiently to bring the weight of the sheets nearly above the axis of the wheel of the truck.

A further purpose is to provide a handtruck adapted to carry finished sheets of sheathing on edge, with spring and hook means for temporarily fastening the upper portion of a lower side of a sheet of sheathing to the upper portion of the truck.

A further purpose is to angularly adjust the inclination of the seat of a hand-truck adapted to carry finished sheets of sheathing on edge and end in order to accommodate the truck to more easily support different lengths of sheets of sheathing.

A further purpose is to store sheets of sheathing on end in bales, with downward clearance spaces upon opposite sides of the supported end, upon one side for easy disengagement of the lifting lip of a hand-truck, used to place the bale, when it is brought from the moulding benches, and upon the other side for easy insertion of the lifting lip of a truck used to transfer the bale for shipment.

Further purposes will appear in the specification and in the claims.

I have elected to illustrate one only of the many forms of my invention, except as to a minor detail, shown in two forms, and have selected a form that is practical and efficient in operation and which well illustrates the principles involved.

Figure 4 is a fragmentary elevation to enlarged scale illustrating the moulds, the benches supporting the moulds, the moulding machines and turn-table, of Figure 1, the moulding machines being shown in somewhat different positions from that of Figure 1.

Figure 7$^a$ is an enlarged vertical fragmentary section through a mould and its finished moulded sheet, and Figure 7$^b$ is an enlarged horizontal section on the line 7$^b$—7$^b$ of Figure 4.

Figure 22 is a section upon the line 22—22 of Figure 23.

Like numerals refer to like parts in all figures.

Describing in illustration and not in limitation and referring to the drawings:—

Floor

The lower floor 30 is taken up by a row of moulding benches 31, intermediate walkways 32, lateral spaces 33 across the ends of the benches, and spaces 34 generally parallel to the benches at the ends of the row. An upper floor 35 is shown above the benches. This floor may be used for storing the raw material, and provides convenient walkways above the ends of the benches for operators of the travelling machines 36 for mixing the gaged plaster and charging it into the moulding machines 37 and 38.

Optionally the travelling machines 36 include cars for the operators and the upper floor may then be dispensed with, wholly or partially.

The benches are preferably alike, except for minor differences in alternate benches due to the moulding machines operating in reverse directions on alternate benches, the finishing end of one mould being at the starting end of adjacent moulds.

The top of each bench supports a mould for any indefinite number of sheets of sheathing, usually 100 feet or more in length, side rails 40 and a sink 41 at the starting end of the mould.

The sinks 41 are alternately at opposite sides of the row of benches because these are the starting ends of the respective moulds and are for use in draining away wash-water, each moulding machine being washed clean of adhering plaster at the sink after it has operated upon the mould of a preceding bench.

I place transverse guiding tracks 42, preferably upon the level of the floor, in front of the ends of the benches for a turn-table carriage 43.

This turn-table carriage is used to transfer the respective moulding machines from bench to bench, turning them around for travel in reverse direction, and the floor rails 42 are at floor level in order to be out of the way of the wheels of a truck 44 (Figures 21 to 23) for transferring the finished sheets from the moulds to storage.

The molding machines are charged with fresh plaster at the sinks 41 from one of the overhead travelling mixing and charging machines 36, after having been first washed clean of the preceding charge and preferably sprayed with oil.

The wash-water is advantageously used over and over. It carries considerable oil, or other liquor used to lessen adherence between the surfaces of the machines and the gaged plaster. This oil or other liquor to some extent coats the machine surfaces during washing, lessening the requisite amount of fresh oil or other liquor sprayed over the surfaces after washing.

I may also use the wash-water in the mixes of gaged plaster in order to take advantage of any slowing effect of the oil upon the setting of the gaged plaster.

I preferably store the finished sheets on end in bales upon raised floor rails 45 and 46.

These rails are beyond and parallel to the tracks 42 of the turn-table carriages. They are raised to give a downward clearance under opposite sides of the lower ends of the bales, for easy placing and removal of the supporting edge 47 of the truck 44 used in transferring the bales, (Figures 21 and 22).

Figures 21, 22, 23, 24, 25, 26, 27:
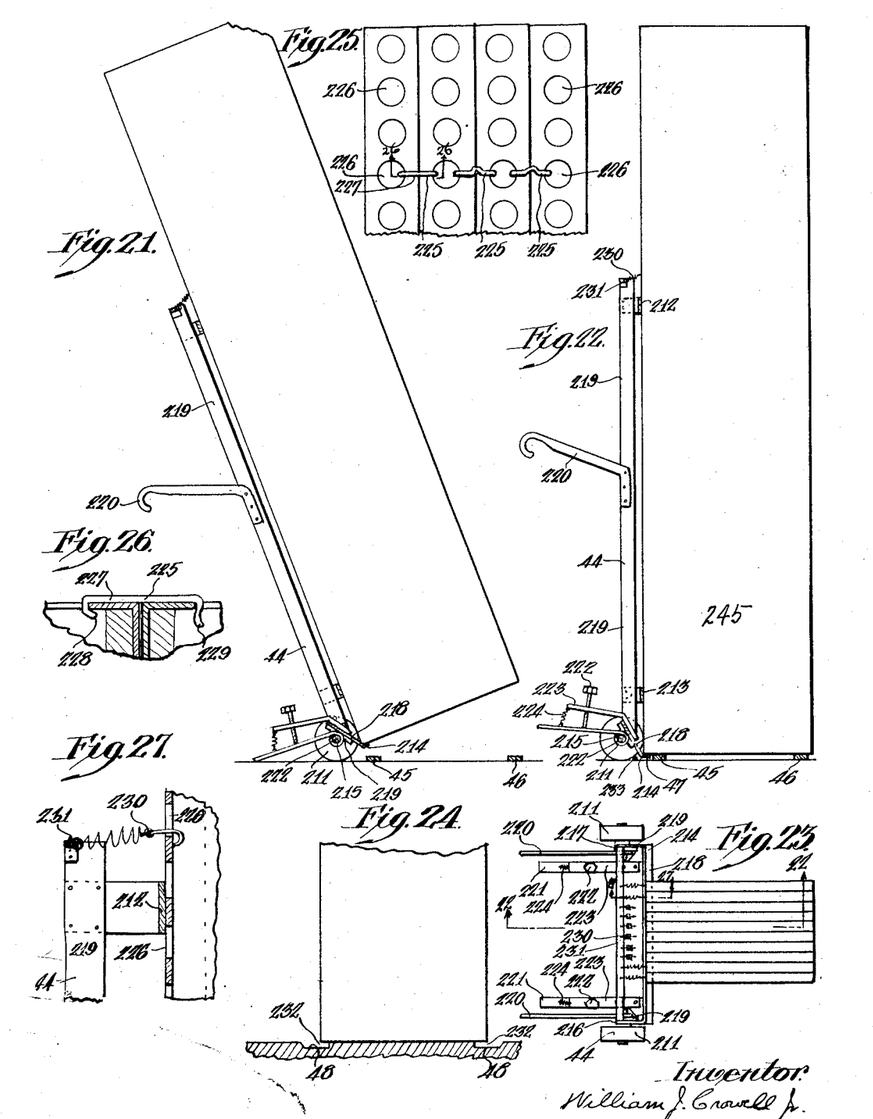
Figures 21 and 22 are elevation views showing a desirable form of hand-truck for handling the sheets of finished sheathing. The views are the same except as to difference in positions which are respectively that during loading and delivery of the sheathing.
Figure 23 is a top plan view of Figure 22.
Figure 24 is a fragmentary elevation illustrating a different form of storage seat for the bales of finished sheathing from that of Figures 1 and 22.
Figure 25 is an enlarged fragmentary side view of one end of a bale of finished sheets, illustrating a preferred form of tie between adjacent sheets.
Figure 26 is an enlarged section of Figure 25 taken upon the line 26—26.
Figure 27 is an enlarged detail section of Figure 23 taken upon the line 27—27 illustrating a temporary fastening between a finished sheet of sheathing and the hand-truck.

Optionally this clearance may be obtained by depressing the floor along each side of the bales as best seen at 48 in Figure 24.

Benches

These are best seen in Figures 1 to 7 and serve to support the raised moulds 39 and the rails 40 for carrying the moulding machines, and supply storage compartments for raw materials.

Each bench has longitudinal recess compartments 49 in and along the sides for storing the perforated side angle members 50 used for side reinforcements of the individual sheets of sheathing, and transverse recess compartments 51, for storing the short channel irons used in reenforcing the sheets across the ends and middle, and the sisal or jute fiber and scraps of burlap used with gaged plaster for tying the transverse members to place.

Each storage recess 49 for the side angles is shown with an upwardly extending lip 52 and the lateral opening 53 into the recess along the length of the bench is made more easy at 54 by chamfering away the outer ends of the transverse joists 55 supporting the bench floor 56.

The moulds comprise bottom members 57 and sides 58 both extending nearly the full length of the bench. The bottoms of the moulds are desirable smooth cement slabs moulded to place and having a portion raised ½ to ¾ of an inch above the top of the bench.

The side members 58 may be of wood and are removably held to place against the side edges 59 of the cement slabs by longitudinally spaced pairs of cooperating wedges 60 and 61, which are spaced along the length of the bench between the sides of the mould and outer rails 40 which form tracks for the wheels of the moulding machines.

The rails 40 thus perform the double duty of a runway for the moulding machines and of laterally supporting the wedges against the side members 58 of the moulds.

*Moulding machines*

Figure 7:
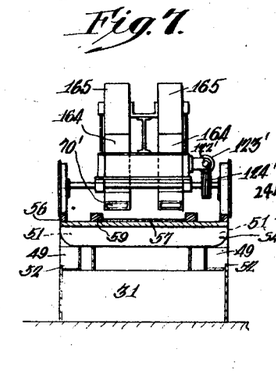
Figure 7A:
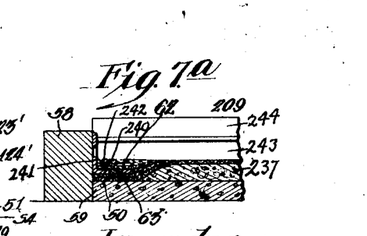
Figure 8:
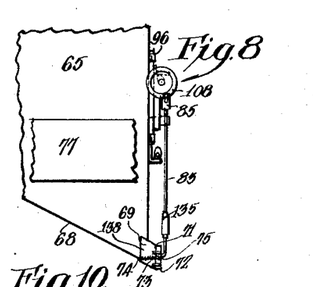
Figures 8 and 9 are fragmentary side and front elevations respectively, to enlarged scale, of moulding machine structure shown in Figures 4 to 6.

There are two moulding machines, of which the first 37 lays the initial bed of burlap and gaged plaster over the whole floor of the mould and the second and smaller machine 38 lays lateral beds 62 (of Figure 7ᵃ), over the submerged flat portions 63 of the side angles.

The larger moulding machine is best seen in Figures 4, 5 and 6 and Figures 8 to 16 and comprises a carriage 64, a supply tank 65 for the gaged plaster, and a supply roll 66 for burlap, with auxilary mechanism for properly delivering the plaster and burlap across the width of the mould and for pressing the burlap down into the wet plaster.

The burlap may be used the width of the mould or burlap wider than the mould may be used and folded at the sides to fit into the mould.

The latter method offers an advantage of double thickness of burlap reinforcement along each side of the mould and permits the use of burlap of standard width but requires folding structure not needed when the burlap is already the width of the mould. I have illustrated my machine as using the wider burlap in order to show the folding structure.

When the burlap used is the width of the mould the folder mechanism 67 is dispensed with and the spool 66 carrying the burlap is correspondingly more narrow than shown in the figures. Otherwise the arrangement will be substantially the same.

I prefer to deliver gaged plaster in a uniform stream that extends substantially across the mould, as this avoids the need for spreading the plaster.

The supply tank 65 is of rectangular section and has no inside valve connections. Its bottom 68 preferably slopes downwardly to the delivery spout 69, the sloping bottom making delivery from the tank more complete and washing more easy.

The delivery spout is shown nearly as long as the mould is wide. It is suitably a brass casting fastened across the rear end of the tank having a long narrow port 70 across and somewhat above the mould, and a finished seat 71 for a cooperating gate valve member 72.

The valve member 72 is held resiliently to its seat by springs 73 at opposite ends of the member.

Each spring 73 is stretched between anchors 74 and 75 respectively on the side of the tank and an intermediate portion of the end of the valve member.

The head of plaster inside the tank progressively falls as the machine travels along a mould. This requires a progressively wider opening of the valve or else a progressive slowing in the rate of travel of the machine, to give uniform thickness of bed.

I prefer to move the machine at a uniform rate, progressively opening the valve as the machine progresses along the mould.

I show a motor 76 for rolling the machine along the mould.

This motor is mounted upon one of the side frame members 77 and carries a worm wheel 78 which meshes with a worm gear 79 upon the shaft 80 of the forward wheels 81.

The wheels 81 are rigidly fastened to the shaft 80 and the motor turns the worm gear which has clutch connection at 82 to the shaft.

The clutch is closed when the motor is to drive the machine along the mould, and open if the machine is to be rolled along by hand.

I use the uniform movement of the machine along its track to gradually open the gate valve, giving the valve any predetermined initial opening as the machine starts at one end of a mould and opening it progressively wider automatically by the motion of the machine, and opening it relatively faster as soon as surface of the plaster inside the tank falls to the sloping portion of the bottom of the tank.

I also provide for a hand adjustment of the valve independent of its automatic movement from the motion of the machine.

I hook vertical link members 83 into suitable holes 84 at opposite ends of the gate, the holes extending part way only through the gate.

The link members extend upwardly and make pivotal connection at 85 and 86 to rocker arms 87 and 88.

The rocker arms are pivotally supported in and through the extended ends 89 of pivot members 90 which are pivotally supported by a block member 91 in slots 92 and 93.

The block member is carried upon straps 94 and 95 that are constrained to vertical movement by suitable guides 96 near opposite ends of each strap.

Each strap carries an outwardly extending abutment 97 which presents a downwardly directed supporting face 98 to a cam member 99 carried upon a horizontal rod 100, and the vertical position of the block is controlled by angular adjustment of the rod 100 carrying the supporting cam 99.

The rod 100 extends across the face of the tank and is mounted in suitable bearings 101 and 102 at opposite sides of the tank. It is adapted to a slight longitudinal movement in its bearing and upon one side carries a clutch member 103 which locks the shaft from turning by engaging a cooperating stationary clutch member 104 that may comprise an outer face of the bearing 101.

Normally the clutch members 103 and 104 are held together by a spring 105 upon the other end of the rod. This spring surrounds the extended end of the rod between the bearing 102 and a loose sleeve or washer 106 adjacent a handle 107 pinned to the rod 100.

The handles 107 and 108 are fastened to opposite ends of the rod and may either one be used to adjust the vertical height of the block 91 in order to change the extent of opening of the valve.

When operating either of these handles the rod is moved somewhat longitudinally to the left (Figure 9) before turning in order to release the clutch members 103 and 104.

Figure 9:
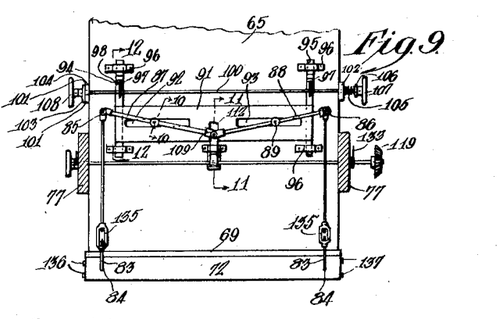
Figures 10, 11:
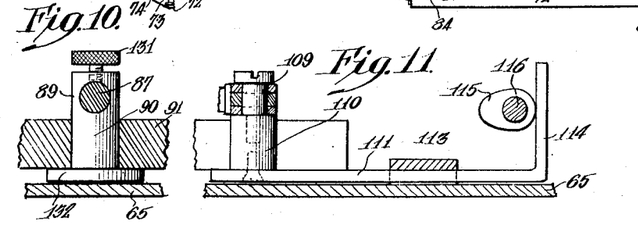
Figures 10, 11 and 12 are detail enlarged scale sections of Figure 9 taken respectively upon the lines 10—10, 11—11 and 12—12 thereof.
Figure 12:
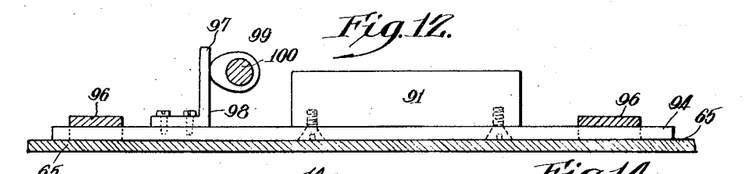

The rocker arms 87 and 88 mounted upon pivots 90 are pivotally connected together at 109 Figures 9 and 11, upon the reduced portion of a common pin 110.

The pin 110 is mounted upon a strap member 111 which is constrained to vertical movement by the vertical walls of a slot 112 in the block member in cooperating with the pin 110 and by a guideway bracket 113 upon the face of the tank.

The lower end of the strap member 111 has an outwardly extending portion 114 which presents an upwardly directed supporting surface to a cam member 115 that is operated by the movement of the wheels of the machine.

The cam 115 is carried upon a horizontal shaft 116 mounted in bearings 117 and 118 upon opposite sides of the frame, and an extended end of the shaft 116 carries a bevel gear 119, (Figures 9 and 5), which meshes with a corresponding bevel gear 120 upon a shaft 121.

The shaft 121 is in axial alinement and clutch connection with a shaft 122 carrying a worm gear 123 that meshes with a worm wheel 124 upon the shaft 125 of the rear wheels 126 of the machine.

The wheels 126 are keyed to the shaft 125 so that as the machine is rolled along its track, the shaft 125 and its worm wheel 124 rotate, slowly rotating the worm gear 123 and thereby operating the cam shaft 116 or not according as to whether the clutch 127 between the coaxial shafts 121 and 122 is open or closed.

Figure 14:
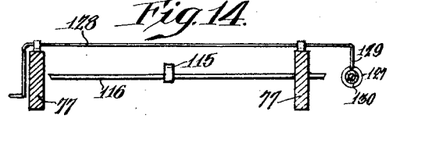
Figure 14 is a section taken upon the line 14—14 of Figure 13.

The clutch 127 may be of any suitable commercial type and is preferably spring pressed to closure and opened from either side of the machine, (see Figure 14).

Normally the clutch is held closed by a suitable spring, not shown, and is opened for hand adjustment of the position of the valve at the pivot member 110 by angularly moving a crank rod 128 at either side of the machine.

The crank rod 128 releases gear connection between the valve and the movement of the machine and has an operating crank toe 129 in the operating groove 130 of the clutch.

Hand adjustment in the vertical position of the pivot connection 110 between the rocker arms 87 and 88 is made to change the setting of the valve gate with respect to the position of the machine, as in resetting the valve to closure after the machine has completed its travel along a mould, being washed out and is ready for a fresh charge of plaster.

The valve remains closed after the machine has been recharged with plaster until it starts to operate on a new mould.

At the instant of starting upon a new mould the valve is opened to a predetermined definite extent, either by loosening the clutch 103 and suitably turning a handle 107 or 108 of the rod 100 or by loosening the clutch 127 and giving suitable angular movement to the cam shaft 116.

As the machine progresses along its track the rotation of the rear wheels gradually opens the valve by rotating the cam 115 which supports the pivot 110 against upward movement. The motion of this cam is such as to gradually pull down the member 110 and the inner ends of the rocker arms 87 and 88 to raise the gate.

The form of the cam 115 is best determined by experiment. This is done by making preliminary operations without the automatic feature, maintaining the flow of plaster uniform by continual slight adjustments of one of the hand adjustment wheels and noting the extent the valve should be open at different positions along the track. The cam is then formed to have the valve open to this predetermined extent at these different positions along the track.

The pivots 90 of the rocker arms are slidably adjustable along the rocker arms upon loosening the set screws 131. They rock in the slots 92 and 93 of the block and are provided with inner flanges 132 to maintain them from moving outwardly, as best seen in Figure 10.

Preferably the cam shaft 116 makes somewhat less than one complete revolution during the progression of the machine along the full length of the mould, or if the machine is to operate upon two moulds on a single charge of plaster then the shaft 116 should make one rotation only in travelling forward along one mould and back along another.

Desirably the cam shafts 100 and 116 carry indicating arms 133 and 134 respectively at each side of the machine and suitable scales or marks are made upon the adjacent side of the frame structure to show the proper initial settings of the shafts when starting across a mould.

It is evident that the extent of movement of the gate for a given movement of the machine along the bench is subject to very considerable adjustment by varying the position of the pivot members 90 along the rocker arms 87 and 88.

The vertical links 83 are desirably provided with turn buckle adjustments at 135 although this is principally for convenience in initial setting.

The gate valve is shown with inwardly projecting guides 136 and 137 at each end. These slide along the end faces 138 of the spout member, and maintain the gate in proper longitudinal position.

The roll of burlap 37 is upon a spool 139 which is rotatably supported between spaced bearings 140 on brackets 141 from opposite sides of the tank.

The folder 67 is also carried by the brackets 141, and is shown diagrammatically only.

The unwinding strip 142 of burlap passes downwardly from the burlap roll under a guiding roller 143 at the entrance of the folder, horizontally forwardly through the folder, over a guiding roller 144 at the folder exit, downwardly to a third guiding roller 145, suitably supported above the mould and somewhat behind the delivery spout 65, and from under the roller 145 rearwardly under a multiple disc roll 146 into the bed of laid plaster, the discs of the roll 146 pressing the burlap down into the plaster.

The folder 67 comprises a horizontal passage having a forwardly converging floor over which the strip of burlap passes and sides bent upwardly and inwardly to guide the folding, which is initially started by hand. At the entrance roller 143 the pasage has the width of the unfolded burlap and at the exit roller 146 its width will be the desired width of the folded burlap.

The roll 146 for pressing the burlap into the bed of plaster is best seen in Figures 4, 5, 6, 15 and 16. It surrounds the common shaft 125 of the rear wheels of the machine, is vertically adjustable and is adapted to be lifted by any relatively hard object passing under the roll.

A tube 147 carries externally alternate discs 148 and spacer washers 149 along its length and internally is supported upon end bearings 150, illustrated as commercial roller bearing units.

The bearing units 150 are carried upon tubular flanges 151 of hanger 152.

The outsides of the hangers engage the inside faces of the side frame member 77, each hanger having an outwardly extending supporting flange 153 above the frame member.

The flange 153 is perforated on opposite sides of the roll to pass bolts 154 threaded into the top of the frame member. It is supported upon collars 155 of these bolts, and kept in vertical alinement by guide pins 156 in the inner face of the frame. The roll is held down by its own weight and when desirable by springs 157 upon outer portions of the bolts 154.

The discs 148 are of light sheet metal, as for example the heavier grade of the galvanized sheet iron of commerce, and the intermediate spacer washers are suitably short sections of tubing.

The thin discs ride the burlap into the plaster, the liquid plaster rising into the intermediate spaces 158.

Figures 13, 15, 17:
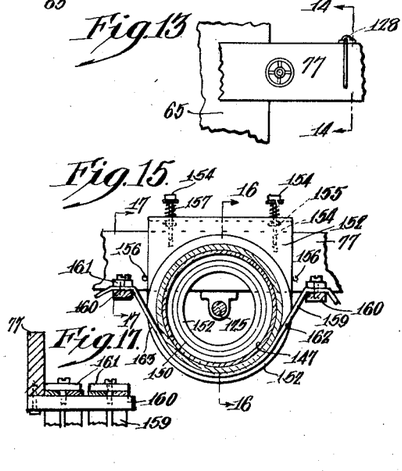
Figure 13 is an enlarged fragment of Figure 4 with parts removed for greater clearness.
Figure 15 is a fragmentary section of Figure 5 to enlarged scale taken upon the line 15—15 thereof and corresponding also to a section upon the line 15—15 of Figure 16.
Figure 17 is a fragmentary section upon the line 17—17 of Figure 15.
Figure 16:
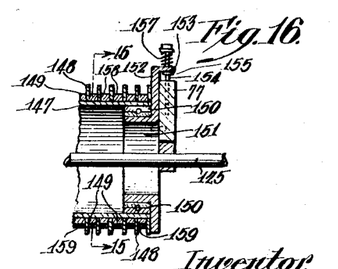
Figure 16 is a section upon the line 16—16 of Figure 15.

These intermediate spaces are suitably about 3/4" wide and I continuously sweep them free from plaster adhering to the sides of the discs by metal ribbons 159, (Figures 15 to 17).

The cleaning ribbons 159 are supported at opposite ends along transverse strips 160 to which they are clamped in pairs by clamp members 161. They loosely engage the lower circumferential portions of the spacer members above the plaster and forwardly and rearwardly cut diagonally across the intermediate spaces at 162 and 163.

As the roll rotates the adhering plaster is pushed outwardly by the ribbons along the length of the roll, at the line 163.

The small moulding machine 38 may desirably have many of the features of the larger machine. Its function is to lay the relatively narrow beds of gaged plaster and burlap along each side of the mould over the submerged flat portions of the side angle members.

Preferably the small machine comprises similar laying units supported upon carriage frame work upon opposite sides of the mould.

Each unit comprises a small tank 164 for holding sufficient gaged plaster for laying the mould, a roll 165 of narrow width burlap and suitable valve mechanism for the supply tanks and guide rollers 166 for the burlap; also preferably a motor adapted to drive the machine at constant but adjustable speed.

Substantially the same valve mechanism is used as in the large machine and I have, therefore, not shown this in full detail marking corresponding parts with the same number as in the large machine but with prime mark for distinction.

The rolls of burlap 165 are mounted upon suitable spools 167 which turn in bearings 168 carried by the supporting frame structure 169 of the carriage.

Figures 1, 3:
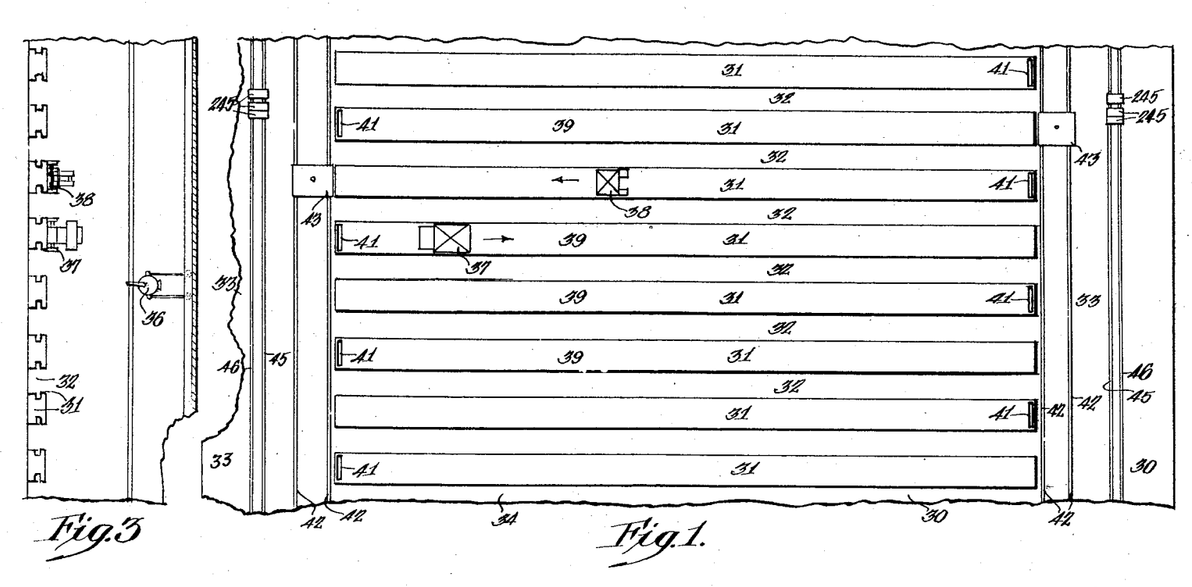
Figures 1, 2 and 3 are fragmentary diagrammatic views respectively, top plan view and end and side elevations of a floor lay-out embodying my invention.
Figure 2:
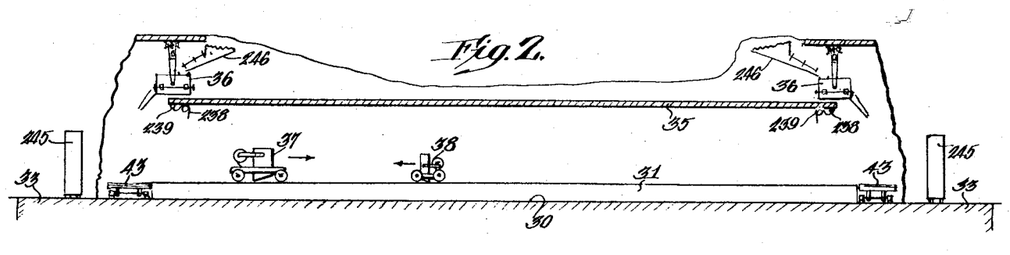
Figures 4, 7B:
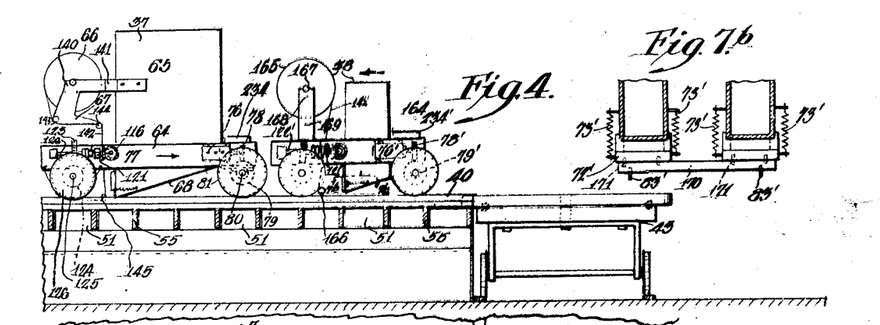
Figure 5:
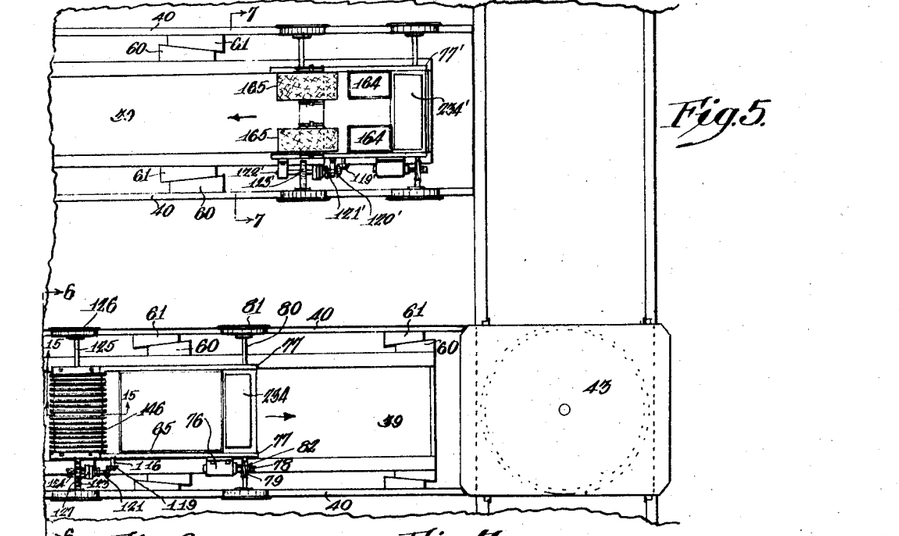
Fig. 5 is a top plan view of Figure 4.
Figure 6:
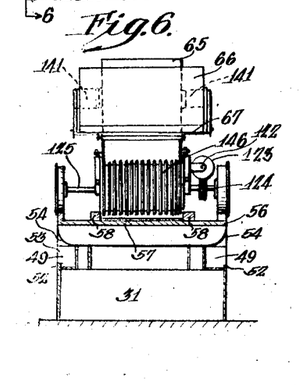
Figures 6 and 7 are sectional elevations of Figure 5 taken respectively upon the lines 6—6 and 7—7 thereof.

The valve members 72' are operated simultaneously by hand control and also operated automatically by the movement of the carriage along its track. There is a separate valve for each tank. Each valve is held to its duty against its seat by springs 73' at the sides of the tank. Valves are opened simultaneously by a cross member 170 which has loose connection at 171 with the valve members and guides them up and down, as best seen in fragmentary Figure 7$^b$.

The operation of the valves being exactly similar to that of the large machine, with the exception that the vertical links 83' operate upon the intermediate guide member 170 to position both valves simultaneously and yet permit freedom of individual seating under the actions of the springs 73', further description of mechanism is not necessary.

Mixing machine

Figures 18, 19, 20:
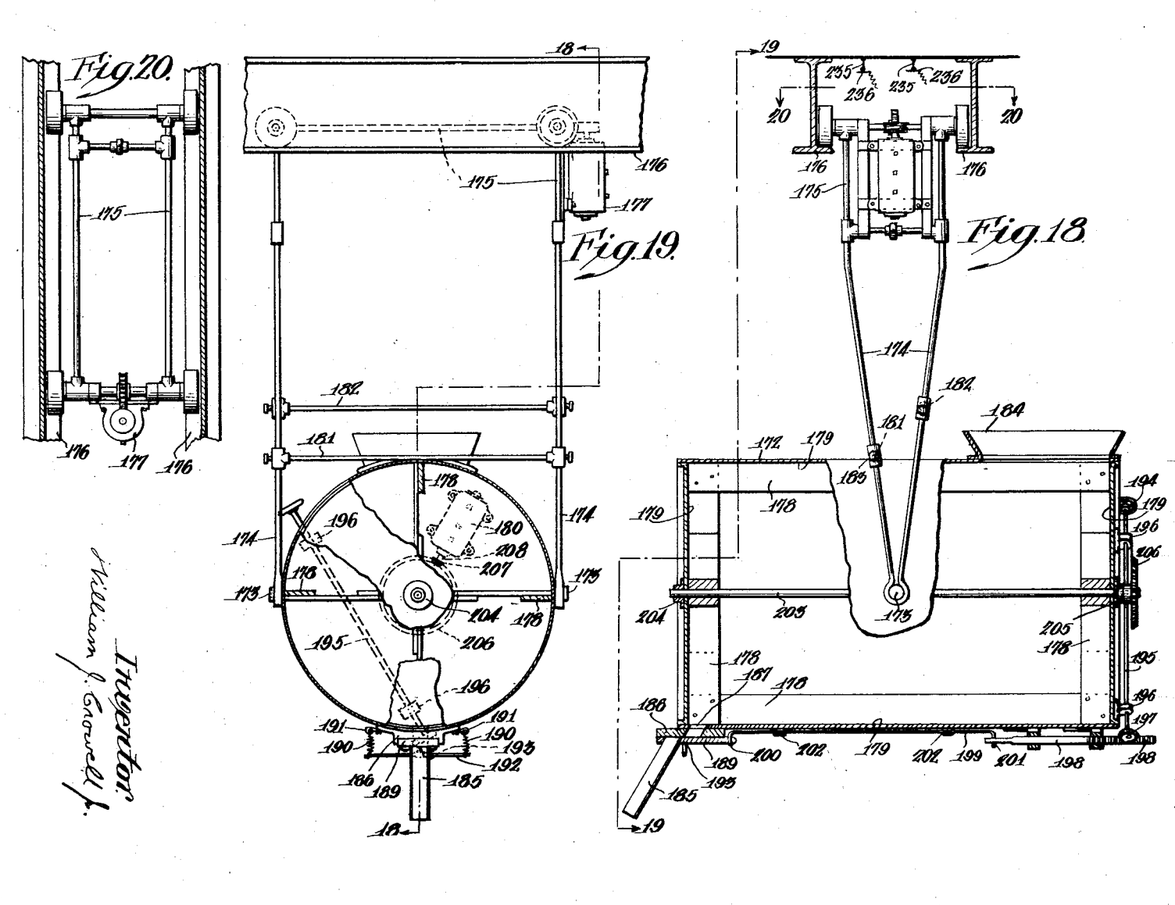
Figures 18 and 19 are side and end views, largely in section of a mixing and charging machine, the sections being respectively upon the line 18—18 of Figure 19 and 19—19 of Figure 18.
Figure 20 is a horizontal section upon the line 20—20 of Figure 18, showing an overhead carrier of the mixing and charging machine.

This is best seen in Figures 18 to 20 and comprises a cylindrical vessel 172 mounted upon horizontal trunnions 173 which are pivotally supported in hangers 174 from a transversely movable carrier 175. The carrier 175 is adapted to roll overhead along I-beam tracks 176, and operated by a suitable motor 177.

The cylinder 172 has internal mixing paddles 178 which make an easy sliding fit with circumferential internal surface 179 of the cylinder and are rotatable by a motor 180 for mixing.

Transverse rods 181 and 182 carried by the front and rear hanger rods respectively limit the rearward and forward movements of the cylinder on its trunnions by respectively engaging forward and rearward portions 183 and 184 of the cylinder.

In its normal horizontal position for charging and mixing, the cylinder tends to tip rearwardly by reason of the greater weight at the rear end, and rearward motion beyond the horizontal is prevented by the stop rod 181 engaging the cylinder at 183.

When the mixer is discharging into one of the moulding machines it is tipped forward for more easy and more complete delivery until the rearward stop rod 182 engages the container at 184.

I show the cylinder provided with a delivery spout 185 from the forward end of the bottom of the cylindrical portion. A saddle casting 186 is fastened upon the outside of the cylinder over a delivery opening 187 through the bottom of the cylinder, and forms a seat for a valve member 189 held to place by springs 190. The springs 190 are anchored to opposite sides of the saddle at 191 and the lower ends fastened to the opposite ends of a transverse member 192 which engages the valve at 193 holding it to place against its seat.

The valve carries the delivery spout 185, and is operated from the rear end of the machine at a handle 194 which is mounted on a shaft 195 that turns in bearings 196 and carries a pinion 197 which is adapted to longitudinally position the valve.

A rack member 198 meshes with the pinion and is operatively connected with the valve by a link 199 which has opposite ends respectively hooking into the valve at 200 and into the rack member at 201. The link 199 may be guided by suitable bearings 202 or less desirably, may be supported by the valve member at one end and the rack member at the other.

The shaft 195 of the handle extends diagonally across the rear end of the cylinder to be better out of way of mechanism operating the paddles inside the tank.

The paddles 178 are carried upon a shaft 203 extended through the ends of the machine to turn in bearings 204 and 205. The rear end of the shaft carries a bevel gear 206 that is outside the bearing 205 and meshes with a bevel pinion 207 mounted upon the shaft 208 of the motor 180.

The valve mechanism shown is a particularly desirable one in that it has no parts that are not easily removable for cleaning.

By unhooking the springs 190 the valve drops away permitting easy cleaning of the delivery openings should they become contaminated with set plaster.

The mixer should be very thoroughly washed out after each mix, and preferably sprayed with oil before recharging.

Handling the finished sheathing

After the moulded sheathing has sufficiently set, separating strips 209 that have been inserted between successive sheets are removed and the sheets are cut apart and transferred to storage rails 45, 46 by a hand truck 44 best seen in Figures 21 to 23.

The truck 44 travels along the passages between the benches and receives the sheets of sheathing on edge side by side and diagonally on end.

The receiving bed of the truck slopes diagonally upward and rearward sufficient to seat the sheets with their centers of gravities somewhat rearward of the axis of the wheels 211, the truck engaging one side of each sheet on transverse upper and lower flats 212 and 213 and on a forwardly and upwardly projecting lip 214 at the bottom.

The wheels 211 are mounted on an axle 215 which turns in end bearings 216 and 217 that are rigidly fastened to an intermediate flat plate 218, with which the lifting lip 214 is preferably integral. The side standards 219 are fastened to opposite ends of the plate 218 and support the seating flat members 212 and 213, and the handles 220, by which the truck is rolled along the floor.

The forward portion of the plate 218 is bent to lie perpendicular to the side of a sheet seated against the upper and lower flats 212 and 213, so that when a sheet is resting upon the seating members of the truck it is properly supported at the bottom by the lifting lip 214. This lip extends the full length of the plate 218.

Spaced members 221 that are in effect rear feet, are pivotally mounted at 222 to the axle 215 and are adjustably limited in upward angular movement by screws 222 threaded through straps 223 that are fastened to the plate member and extend rearwardly.

The straps 223 in cooperation with the screws 222 and the feet members 221 thus adjustably limit the extent of rearward tilting of the truck. The feet members are preferably held against the ends of the stop screws by suitable springs 224 stretched between rearward portions of the straps 223 and the feet members.

The sheets are preferably fastened together in bales of number such that one man can conveniently handle them upon the truck, and Figures 25 and 26 illustrate a convenient fastening between the adjacent sheets of each bale.

The finished faces of adjacent sheets are put together so that a bale usually comprises a number of pairs of sheets, each pair having finished faces together.

Desirably the sheets are fastened together while loaded upon the hand truck, and this is conveniently accomplished by hook members 225 between adjacent perforations 226 in the side angle members of adjacent sheets.

The hook members 225 may be of heavy stiff wire, formed for easy insertion and tightened after insertion by crimping with pliers or suitable crimping tools.

Figure 25 shows a fragmentary portion of two pairs of sheets bound into a bale of four sheets.

The hook fasteners are normally placed in rows from sheet to sheet across opposite sides of a bale near opposite ends of the bale.

In Figure 25 one of the hook members 227 is shown not yet crimped and the two others are shown tightened by crimping.

Desirably one end 228 of the hook member is made into a definite hook and the other is provided with a forwardly bent extremity 229 for more easy insertion of the member if the fitting of the hook is initially somewhat tight.

When placing the sheets upon the truck the center of gravities of the sheets are supported by lying back of the axis of the wheel.

During wheeling the bale along the floor the center of gravity of the bale is normally nearly above the axis of the wheel in order to make minimum the amount of lifting by an operator.

In order to avoid any danger of the bale toppling forward from the truck I provide spring hooks 230 (Figures 22, 23 and 27) suitably placed along a transverse member 231 between the upper ends of the standards 219. These spring hooks are anchored to the transverse member at positions corresponding to the middle of successive sheets and each is adapted to hook into adjacent perforations in the side angle of the adjacent sheet. This is best illustrated in Figure 27 which shows an enlarged fragment with a hook in one of the perforations and the hook resiliently pulling the sheet back against its upper seat 212.

Figure 23 shows as many spring hooks as there are sheets in the bale but two only in use, at opposite sides of the bale.

The hook or spring hooks used to hold the bale in place will vary according to circumstance and according to the operator, and all or none, or any intermediate number of the hooks being used according to circumstance.

After a sufficient number of sheets has been loaded on to the hand truck to make one bale and the sheets have been fastened together by the hook members the bale is transferred to the storing rails 45 and 46. These are desirably across the ends of the benches spaced somewhat outside of the tracks 42 of the turn table carriages for use in transferring the moulding machines from bench to bench.

I desirably support the bales on end on spaced rails that are raised somewhat from the floor level but optionally may provide longitudinal recesses 232 in the floor to permit downward clearance at the edges of the bales.

Desirably a stop rail 233 (Figure 22) to properly determine the tipping position of the truck, is placed in front of the forward rail. When the wheels of the truck reach this stop the truck is tilted forward which places the bale in upright position upon the rails 45 and 46. The dimensions of the wheels and seating members of the truck, and the height of the storing rails are preferably selected with an inter-relation such that the bale is upright when the bottom of the bale engages the rails.

The feet members 221 which in cooperation with screws 222 and straps 223 limit the rearward tipping of the hand truck may optionally be provided with wheels, but I prefer these members without wheels as they serve more effectively to hold the truck to position during loading if they rest directly upon the floor.

The inclination of rest of the truck for loading may be varied widely by changing the position of the screws 222.

Normally the hook members 225 tying the sheets of the bales together upon opposite sides at each end and optionally also at one or more intermediate rows on opposite sides form sufficient tying for storage and shipment.

Sometimes, however, it may be desirable to further protect the ends of the bales with burlap and plaster. When this is done, the wet plaster and burlap may be placed over each end of a bale, which effectively ties the sheets of the bale together, and protects the ends of the sheets from injury during storage and shifting, and reduces the requisite number of hooks.

The moulding machines preferably carry storage batteries 234 and 234' for operating the motors, and the current for the motors 177 of the travelling carriers 175 is preferably supplied by overhead bus wires 235 and suitable trolleys 236 from the respective carriers.

Optionally the motors of the moulding machines may also be supplied from overhead buses.

Operation

Surfaces of a mould are cleaned and oiled preparatory to moulding.

The larger moulding machine is charged with definite predetermined quantities of gaged plaster and burlap, preferably on the bench at the starting end of a mould. It is then driven at a preferably uniform speed along the bench, from the starting end to the finishing end of the mould, laying the initial bed of plaster and burlap over the bottom of the mould. This initial bed is normally about 3/8 to 1/2 inch deep.

When the machine reaches the end of the mould it travels on to the turn table carriage and is at this time empty of plaster, the charge of plaster having been just sufficient to lay the initial bed 237 (Figure 7ᵃ) for the length of the mould.

The turn table is turned through 90 degrees and pushed to the end of the bench, turned through an additional 90 degrees and moved to washing position above the sink where it is thoroughly washed with a hose 238 that is preferably fastened above each sink from a transverse pipe line 239 along the bottom of the platform 35 above the ends of the benches.

After the machine has been washed clean it is recharged with plaster from the travelling charging and mixing machine 36, and recharged with burlap and then operates upon the next mould.

Returning to the first mould, operators upon each side of the bench insert the side reenforcement members, angle irons 50 (Figure 7ᵃ), at opposite sides of each sheet.

The angle irons are pushed down into the bed of plaster along the sides of the mould with one perforated flat 240, horizontally immersed in the plaster and the other 241 vertical.

The smaller moulding machine now follows laying narrow beds 242 of burlap and plaster on the immersed flats of the angle iron reenforcements along both sides.

When the second machine reaches the end of the mould it is empty, having been charged with just sufficient plaster for the length of the moulding and is rolled on to the turn table and transferred to the second mould, being washed out and recharged at the sink like the larger machine, after which it operates upon the next mould.

Again returning to the first mould, operators on opposite sides of the bench insert the transverse reenforcement members 243 which are usually light channel irons and also insert separating wedges 244 between adjacent sheets.

These wedges are suitably of sheet spring metal and are pushed down between the successive pairs of angle iron side reenforcements, pushing the burlap flat to the bottom of the mould and leaving only burlap to be cut when the sheets are cut apart.

After sufficient time for setting, the separating strips 244 between the sheets are taken out, the sheets are cut apart and loaded upon the hand truck 44 which is pushed to different loading positions, between the benches. The sheets seat upon the truck diagonally on edge and end, sloping rearwardly far enough to bring the center of gravity of the respective sheets somewhat back of the axis of the wheels in order to reach sufficiently stable equilibrium, for easy handling and delivery of the sheets on end.

The sheets may be hooked temporarily to the uper portion of the truck to avoid danger of tipping forward off the truck when rolling the truck, and are preferably fastened together while upon the truck into one or more bales, by hooks 225 (Figure 25) that are tightened by crimping after insertion.

The bale 245 is delivered by the truck on to the storing rails at the side of the row of benches, or other storage seat providing a downward clearance at opposite edges for easy disengagement and engagement of the lifting lip 47 of the truck.

In shipment the bales are suitably handled by a similar truck, picked up bale at a time from the other side of the storage rails and rolled on to a car or other conveyance for shipment.

The travelling and mixing charging machine 36 is charged with definite quantities of water and plaster at a suitable charging station 246 and travels from this station along the side of the row of benches across the ends of the benches for charging operation at the starting ends of the respective moulds.

Each charge is preferably just sufficient for charging the larger moulding machine and the smaller moulding machine just once. When empty, the machine is washed out and preferably sprayed with oil in order to avoid gradual adherence of setting plaster to any of the surfaces.

The mixing paddles make easy sliding engagement with the interior surface of the mixer, thus sweeping away any adhering plaster from the surfaces.

The delivery port is in the bottom and forward end of the cylindrical portion of the container, and the valve fitting upon the port is outside of the machine and readily removed or replaced.

The transverse stop members upon the cylinders normally limit the angular position of the container to either a horizontal mixing position or an inclined tipping position at which it is positioned to most perfectly discharge the gaged plaster.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention, what I claim as new and desire to secure by Letters Patent is:—

1. In manufacturing reenforced sheathing, a floor, a row of long parallel benches upon an interior portion thereof, and a sheathing mould along the top of each bench, in combination with a moulding machine to operate back and forth on successive moulds along the benches, and having a plaster supply tank, a delivery gate controlling the flow of plaster therefrom into the mould, connections for gradually opening the gate by the movement of the machine along the mould, and a separate hand adjustment of the gate.

2. In manufacturing reenforced sheathing, a floor, a row of long parallel benches upon an interior portion thereof, and a sheathing mould along the top of each bench, in combination with a moulding machine to operate back and forth on successive moulds along the benches, and having a plaster supply tank, an external delivery gate controlling the flow of plaster therefrom into the mould, a pair of rocker arms having outer ends respectively operatively linked to opposite sides of the gate, a vertically movable pivot support for each rocker arm, two gate operating members respectively adapted to move the pivot supports and to move the inner ends of the rocker arms, hand operating means for adjusting the position of one of said members and connections for gradually moving the other of said members by the movement of the machine along the mould.

3. In manufacturing reenforced sheathing, a floor, a row of long parallel benches upon an interior portion thereof, and a sheathing mould along the top of each bench, in combination with a moulding machine to operate back and forth on successive moulds along the benches, and having front and rear pairs of wheels respectively spanning the mould, a plaster supply tank adapted to deliver a bed of gaged plaster rearwardly into the mould, a burlap supply roll and connections adapted to deliver a strip of burlap over the bed and a roll surrounding the axis of the rear wheels, adapted to press the strip of burlap into the plaster.

4. In manufacturing reenforced sheathing, a floor, a row of long parallel benches upon an interior portion thereof, and a sheathing mould along the top of each bench, in combination with a moulding machine to operate back and forth on successive moulds along the benches, and having front and rear pairs of wheels respectively spanning the mould, a plaster supply tank adapted to deliver a bed of gaged plaster rearwardly into the mould, a burlap supply roll and connections adapted to deliver a strip of burlap over the bed and a roll surrounding the axis of the rear wheels, adapted to press the strip of burlap into the plaster, and comprising a tubular hub, alternate discs and spacers therealong, and vertically adjustable end bearings.

5. In manufacturing reenforced sheathing, a floor, a row of long parallel benches upon an interior portion thereof, and a sheathing mould along the top of each bench, in combination with a moulding machine to operate back and forth on successive moulds along the benches, and having a plaster supply tank adapted to deliver a bed of gaged plaster rearwardly over the bottom of the mould, mechanism adapted to deliver a strip of burlap over the bed, a multiple disc roll adapted to press the strip of burlap into the bed, and cleaning ribbons fitting between the discs around the bottom of the roll and extending diagonally upward and outward upon opposite sides of the roll to suitable supports on the machine.

6. In manufacturing reenforced sheathing, a floor, a row of long parallel benches upon an interior portion thereof, and a sheathing mould along the top of each bench, in combination with a moulding machine to operate back and forth on successive moulds along the benches, and having a pair of plaster supply tanks spaced on opposite sides of the machine and having rearwardly directed discharge ports, an external gate adjustably closing each port, lateral springs for each gate pressing it to the port, and connections operable by the movement of the machine along the mould for gradually opening the gates.

7. In manufacturing reenforced sheathing, a floor, a row of long parallel benches upon an interior portion thereof, and a sheathing mould along the top of each bench, in combination with a moulding machine to operate back and forth on successive moulds along the benches, and having a pair of plaster supply tanks spaced on opposite sides of the machine and having rearwardly directed discharge ports, an external gate adjustably closing each port, lateral springs for each gate pressing it to the port, connections operable by the movement of the machine along the mould for gradually opening the gates, and a separate hand adjustment of the opening of the gates.

8. In manufacturing reenforced sheathing, a floor, a row of long parallel benches upon an interior portion thereof, a sheathing mould along the top of each bench, a moulding machine adapted to operate back and forth on successive moulds in rolling along the successive benches, laying a bed of plaster and burlap over the bottom of each mould, a second moulding machine adapted to follow the first to operate on the successive moulds in rolling along the successive benches, laying a bed of plaster and burlap at each side of the first bed, transfer mechanism along each side of the row at the ends of the benches adapted to transfer the machines from the finishing end of one mould to the starting end of the next, and a washing and recharging station at the starting end of each mould.

WILLIAM J. CROWELL, Jr.